Figure 1:
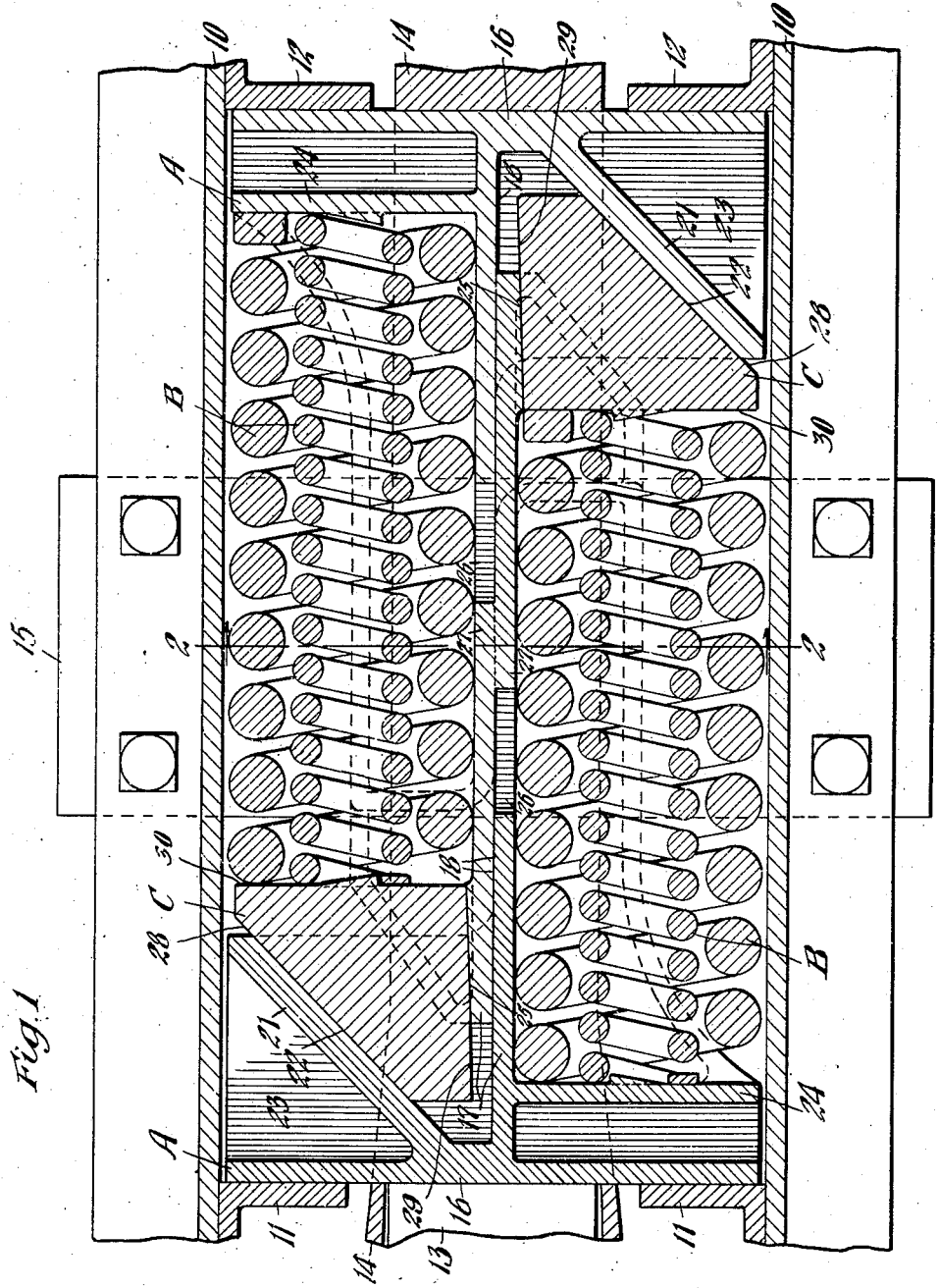

July 8, 1924.

S. B. HASELTINE 1,500,129

FRICTION SHOCK ABSORBING MECHANISM

Filed July 21, 1923   2 Sheets-Sheet 1

Witnesses
Wm. Geiger

Inventor
Stacy B. Haseltine
By George I. Haight
His Atty.

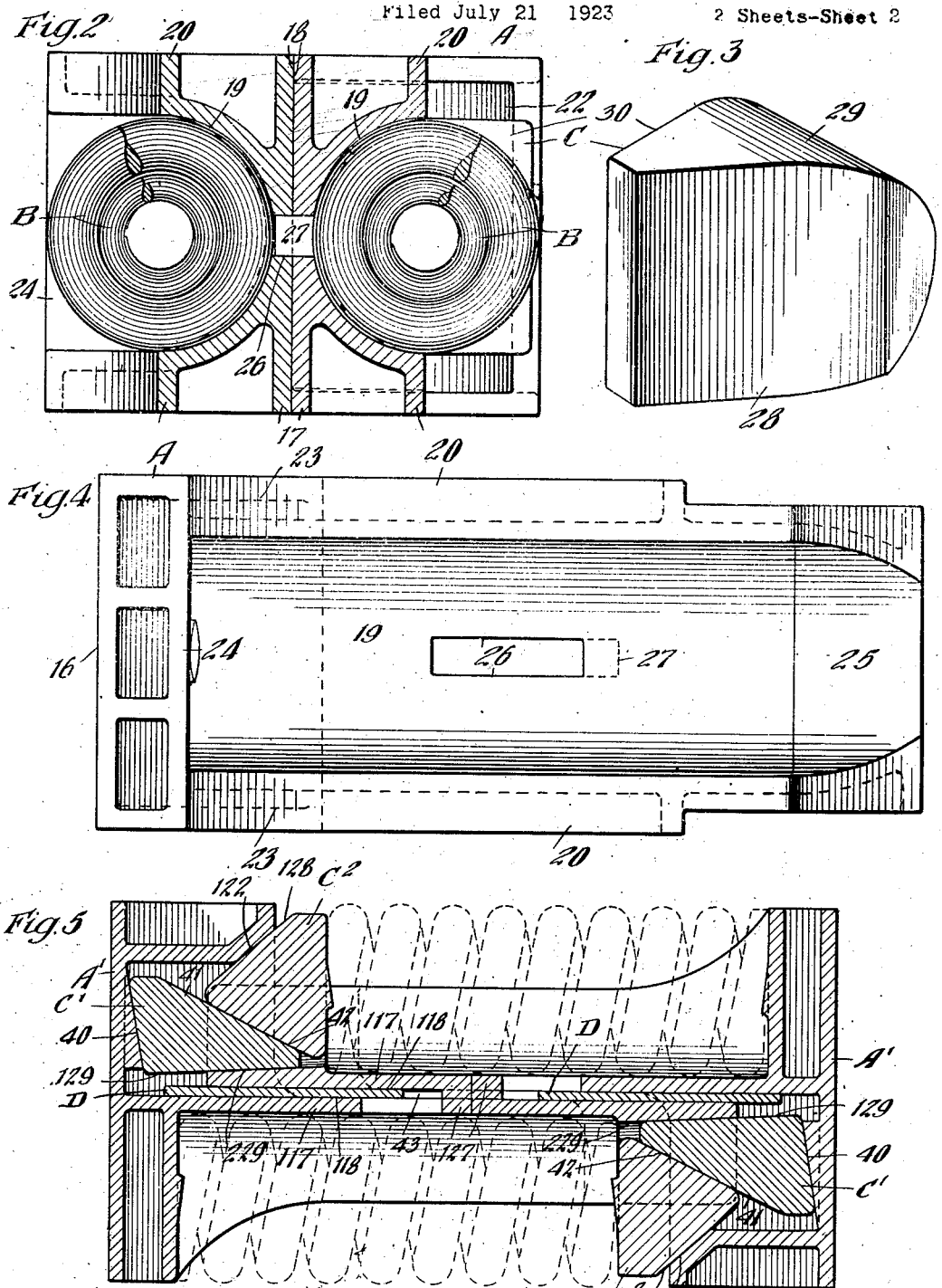

Patented July 8, 1924.

1,500,129

UNITED STATES PATENT OFFICE.

STACY B. HASELTINE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed July 21, 1923. Serial No. 652,901.

*To all whom it may concern:*

Be it known that I, STACY B. HASELTINE, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

An object of the invention is to provide a friction shock absorbing mechanism especially adapted for railway draft riggings, wherein is obtained high capacity by means of relatively few parts having large areas of co-operating friction surfaces.

A more specific object of the invention is to provide a mechanism of the character indicated, wherein are employed two frictionally co-operable cages and associated wedge and spring means, the said cages also co-operating to retain the spring means under initial compression and to hold the parts in assembled relation.

In the drawings forming a part of this specification, Figure 1 is a horizontal longitudinal sectional view of a portion of a railway draft rigging showing my improvements in connection therewith. Figure 2 is a vertical transverse sectional view of the shock absorbing mechanism proper corresponding substantially to the section line 2—2 of Figure 1. Figure 3 is a detail perspective of one of the wedge elements employed in the construction shown in Figure 1. Figure 4 is a side elevational view of one of the friction cages shown in Figure 1. And Figure 5 is a view similar to Figure 1 of another friction mechanism showing a different embodiment of the invention.

Referring first to the construction illustrated in Figures 1 to 4, inclusive, 10—10 denote the usual draft sills of a car underframe to the inner faces of which are secured front stop lugs 11 and rear stop lugs 12. A portion of a draw-bar is indicated at 13, the same being operatively associated with the shock absorbing mechanism proper by a hooded cast yoke 14. The yoke and mechanism therewithin are supported in operative position by a detachable saddle plate 15.

The improved shock absorbing mechanism proper, comprises, broadly, two friction cages A—A; two spring resistances B—B; and two wedges C—C.

Each friction cage A, the same being of like construction, comprises a follower section proper 16 adapted to co-operate with the corresponding stop lugs 11 or 12, and an elongated approximately centrally disposed leg 17 formed integral with the follower section proper. Each leg 17 is formed with a vertically extending flat friction surface 18, the latter extending lengthwise of the mechanism and the two legs being so disposed that, when they are assembled, as shown in Figure 1, the two friction surfaces 18 will oppose each other and will also be in frictional engagement. The lengths of the legs 17 are made such that the two friction cages may approach each other a distance corresponding to the predetermined compression stroke of the mechanism. Each leg 17 is further formed, on the outer side—that is, the side nearest the adjacent draft sill—with a curved, longitudinally extending pocket 19 adapted to accommodate the corresponding coil spring resistance B. Each leg 17 is suitably braced by flanges 20. On the opposite side of each leg 17 to that which accommodates the spring resistance, each friction cage A is provided with an integral, diagonally extending web 21, the inner surface of which 22 forms a wedge face adapted to co-operate with the corresponding wedge C. As clearly illustrated in Figure 1, the walls 21 are suitably braced and strengthened by webs 23. On that side of the leg 17 on which the corresponding spring B is accommodated, each cage A is provided with a transversely extending web 24, which provides a bearing seat for the adjacent end of the corresponding spring B. At the free end of each leg 17 and on the outer side thereof, a friction surface 25 is provided, the latter preferably being inclined at a very acute angle with respect to the center line of the mechanism so as to make the end of each leg 17 slightly tapered. Approximately at their central portions, the legs 17 are provided with elongated openings 26, and, at the inner ends of said openings, with a lug 27 projecting from that side of the leg opposite to the side which is formed with the spring pocket. As clearly shown in Figure 1, the lug 27 of one member A is slidably accommodated in the recess 26 of the other member A and the two shoulders 27 abut when the parts are in their full normal release position. In this manner, it will be observed that the two friction cages A—A are not only adapted to retain the parts in assembled condition, as shown, but may also be utilized to maintain the springs B under initial compression.

The two wedges C are of like construction, each being preferably in the form of a solid block having an outer wedge face 28; an inner longitudinally extending friction surface 29; and a transverse flat spring bearing surface 30. Each wedge face 28 co-operates with the corresponding wedge face 22 of a cage A and each friction surface 29 co-operates with the corresponding tapered friction surface 25 of the leg of the opposite cage A.

The parts are assembled as shown in Figure 1, it being understood that the springs are inserted last. The operation of the mechanism, assuming a buff movement of the draw-bar, is as follows. As the front friction cage A is moved rearwardly—that is, to the right, as viewed in Figure 1—a wedging action is set up between each cage A, corresponding shoes C, and leg 17 of the other friction cage A. The two friction surfaces 18 of the two cages are thus pressed into tight frictional engagement with each other, and, as the front friction cage moves rearwardly toward the other cage A, friction will be generated throughout the entire length of the two surfaces 18—18. Due to the slight taper or inclination of the friction surfaces 25 on the outer sides of and at the ends of the legs 17, a slight differential action of the wedges will also be induced which is accommodated by the wedge C moving slightly laterally outwardly. It will also be observed that friction will be generated between each wedge C and friction surface 25 of the leg of the cage at the opposite end of the mechanism.

From the preceding description, it will be seen that I employ only four pieces additional to the springs; that the two wedges may be made from the same pattern; that the two friction cages may be made from the same pattern; that a large frictional wearing area is presented; and that the parts are held in assembled position by the two cages without the addition of other means.

Referring next to the construction illustrated in Figure 5, the construction of the two friction cages A'—A' is approximately the same as that of the two cages A hereinbefore described. A difference is found, however, in each cage A' in that the wedge face 122 thereof is of lesser extent than the corresponding wedge face 22, and, in addition, an inclined bearing face 40 is employed on the follower section of the cage to co-operate with a wedge C'. The latter has an inner friction surface 129 which co-operates with the corresponding friction surface 229 on the leg 117 of the friction cage A'. Instead of a single wedge being employed at each end of the mechanism, I employ two wedges, the wedge C' just described and a second wedge C². The latter has a wedge face 128 co-operable with the wedge face 122 and the two wedges C' and C² have co-operating wedge faces 41 and 42. In the particular construction of wedges shown, it will be noted that the wedge faces 122 and 128 extend at a relatively blunt angle with respect to the axis of the mechanism, whereas the other set of co-operable wedge faces 41 and 42 extend at a relatively keen angle with respect to the axis of the mechanism. In this manner, I am enabled to obtain high frictional capacity induced by the keen wedge angles 41 and 42 and certainty of release on account of the bluntness of the angles of the faces 122 and 128.

Furthermore, in the construction illustrated in Figure 5, I preferably employ an interposed, steel, friction plate D between the opposed longitudinally extending friction surfaces 118—118 of the two legs of the cages A'. Said plate D has a centrally disposed longitudinally extending recess 43 in which are accommodated the two lugs 127—127 of the two cages so as to adapt the plate D for sliding movement with respect to both cages A'. From the arrangement shown in Figure 5, it will be noted that the plate D is adapted for longitudinal movement with respect to each cage A' in an amount equal to half of the total relative movement permitted between the two cages A' themselves. With this construction, should the plate D stick with respect to one of the cages A' during the first part of a compression stroke of the mechanism, nevertheless, during the last part of the stroke said plate will be so held that it cannot have further movement in unison with that cage with which it stuck during the first part of the stroke. With this arrangement, I reduce the wear on the two friction surfaces 118 to one-half, thereby prolonging the life of the two cages A'.

Although I have herein shown and described what I now consider the preferred manner of carrying out my invention, the same is merely illustrative and I contemplate all changes and modifications that come within the scope of the claims appended hereto.

I claim:

1. In a friction shock absorbing mechanism, the combination with two friction cages having longitudinally arranged and opposed friction surfaces, said cages having integral engaging shoulders limiting their separating movement; of spring and wedge means co-operating with said cages and arranged to exert pressure in a direction transverse to the line of relative movement of said cages.

2. In a friction shock absorbing mechanism, the combination with two friction cages having longitudinally arranged and opposed friction surfaces, said cages having integral engaging shoulders limiting their separating movement; of a friction plate interposed between and co-operable with said friction surfaces; and spring and wedge means co-operable with said cages and arranged to exert pressure in a direction transverse to the line of relative movement therebetween.

3. In a friction shock absorbing mechanism, the combination with two friction cages each having a follower section and a longitudinally extending leg, said legs being provided with opposed friction surfaces; of wedge means interposed between the outer side of and near the end of each said leg and the follower section of the other cage; and spring means between each said wedge means and the follower section of the opposed friction cage.

4. In a friction shock absorbing mechanism, the combination with two friction cages each having a follower section and a longitudinally extending leg, each leg having a friction surface on its inner side and a friction surface on its outer side near the end thereof, the said outer friction surface being inclined with respect to the axis of the mechanism; of wedge means interposed between each said outer friction surface and the follower section of the other cage; and spring means between each said wedge means and the follower section of the opposed friction cage.

5. In a friction shock absorbing mechanism, the combination with two friction cages each having a follower section and a longitudinally extending leg, said legs being provided with opposed friction surfaces; of wedge means interposed between the outer side of and near the end of each said leg and the follower section of the other cage; spring means between each said wedge means and the follower section of the opposed friction cage; and co-operable means on said cages arranged to limit the separating movement thereof.

6. In a friction shock absorbing mechanism, the combination with two friction cages each having a follower section and a longitudinally extending leg, said legs having opposed friction surfaces; of a friction plate interposed between said friction surfaces of the legs and co-operable therewith; wedge means interposed between the outer side of and near the end of each said leg and the follower section of the other cage; and spring means between each said wedge means and the follower section of the opposite friction cage.

7. In a friction shock absorbing mechanism, the combination with two friction cages each having a follower section and a longitudinally extending leg, said legs having opposed friction surfaces; of a friction plate interposed between said friction surfaces of the legs and co-operable therewith; wedge means interposed between the outer side of and near the end of each said leg and the follower section of the other cage; spring means between each said wedge means and the follower section of the opposite friction cage; and co-operable lugs on the cages arranged to limit the separating movement thereof, and, in conjunction with the springs, to hold the mechanism in normal assembled relation.

In witness that I claim the foregoing I have hereunto subscribed my name this 17th day of July 1923.

STACY B. HASELTINE.

Witnesses:
 META SCHMIDT,
 HARRIETTE M. DEAMER.